March 22, 1960   J. F. FINNEGAN   2,929,154
METHOD OF AND APPARATUS FOR CONDITIONING GRAIN
Filed May 24, 1957

INVENTOR.
James J. Finnegan
BY Donns, McDougall,
Williams & Kerr
Attorneys

United States Patent Office 2,929,154
Patented Mar. 22, 1960

2,929,154

METHOD OF AND APPARATUS FOR CONDITIONING GRAIN

James F. Finnegan, Aurora, Ill., assignor to Dunbar Kapple, Inc., Geneva, Ill., a corporation of Illinois Application May 24, 1957, Serial No. 661,519

4 Claims. (Cl. 34—92)

This invention relates to the preserving of grain by making it possible to change the environment in the mass of grain in any ordinary bin without the requirement of any preliminary engineering or duct work on the bin.

It has been found that grain tends to spoil in storage, particularly when the moisture content of the grain is fairly high when the grain is placed in the storage bin or other container. The moisture promotes the growth of molds and other microorganisms which cause fermentation or other deterioration of the grain. The fermentation or other deterioration of the grain generates additional moisture so that the moisture content of the grain tends to increase in storage. In some cases, additional moisture is added to the grain in storage by condensation from the atmosphere. The fermentation in the grain generates heat which raises the temperature of the grain and thus tends to accelerate the spoilage. Thus, it is highly desirable to dry and cool stored grain periodically to prevent spoilage.

One object of the present invention is to provide a new and improved method and new and improved apparatus whereby grain may be dried, cooled and otherwise conditioned, and whereby deterioration of the grain may be stopped and prevented, while the grain remains in storage in ordinary storage bins or the like.

Thus, it is a further object to provide a new and improved method and apparatus whereby grain may be conditioned without any necessity for transferring the grain from one storage bin to another, or otherwise handling the grain.

Another object is to provide new and improved grain conditioning apparatus which is portable and is readily usable with existing, unmodified grain storage bins, for conditioning the grain while it remains in the bins.

A further object is to provide such apparatus which is effective to develop a partial vacuum in the grain contained in a bin, without subjecting the bin to dangerous stresses due to atmospheric pressure.

Another object is to provide new and improved grain conditioning apparatus which is efficient and easy to use, yet is highly economical.

Further objects and advantages of the present invention will appear from the following description, taken with the accompanying drawings, in which.

Figure 1:
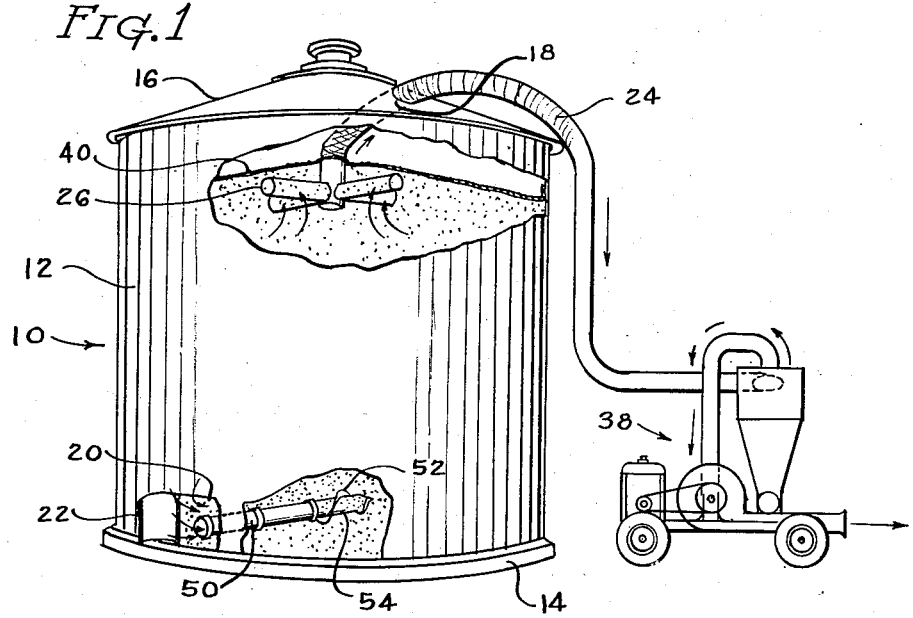
Fig. 1 is a perspective view showing the grain conditioning apparatus which will be described as an illustrative embodiment of the invention.
Figure 2:
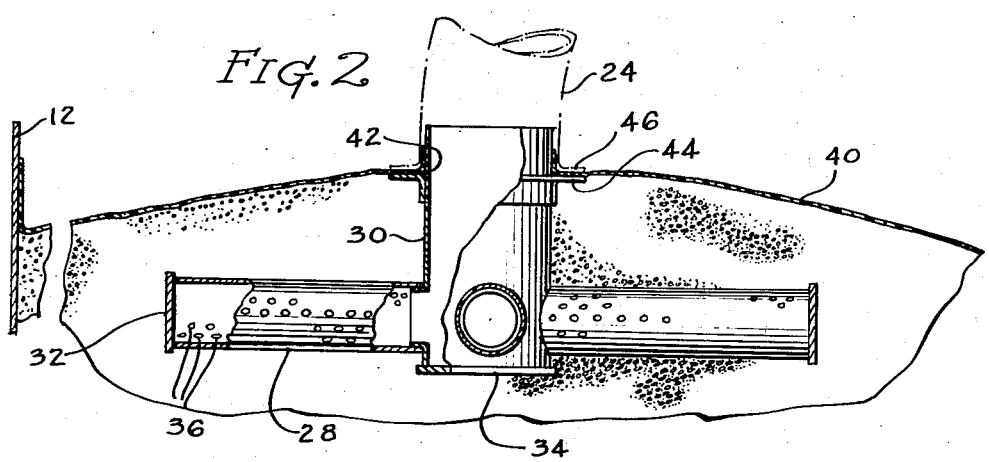
Fig. 2 is an enlarged elevational sectional view taken through the upper portion of the grain in the bin shown in Fig. 1, to illustrate details of a suction screen and a flexible cover sheet for excluding air from the top of the grain.

As already indicated, Fig. 1 shows the manner in which the invention may be practiced to dry, cool and otherwise condition grain contained in an ordinary storage bin 10. It will be understood that the bin 10 may be of various types which are usual or suitable for the ordinary storage of grain. With the method and apparatus of the present invention, it is entirely unnecessary to provide special bins, inasmuch as the invention may be practiced while the grain is held in an ordinary bin. Illustrative bin 10 is of the cylindrical or silo-shaped type having a substantially closed cylindrical side wall 12, a closed bottom 14, and a generally conical roof or top wall 16. The illustrated top wall 16 has the usual opening 18 through which grain is discharged into the bin. The top wall 16 need not be airtight to practice the present invention. In fact, the opening 18 in the top wall is preferably employed to gain access to the top of the mass of grain in the bin.

The illustrated bin 10 has the usual opening 20 at the bottom of the side wall 12, through which grain may be withdrawn from the bin. A door or other closure 22 may be provided for closing the opening 20.

In practicing the invention, the suction pipe 24 is inserted into the mass of grain in the bin 10, preferably through the top opening 18. In this case, the end of the suction pipe 24 is immersed in the mass of grain, but is disposed near the top of the mass. The end of the suction pipe 24 is covered with a screen 26 which admits air to the suction pipe while excluding grain. The illustrated screen 26 happens to take the form of a plurality of perforated pipes 28 radiating horizontally from a vertical pipe 30 connected to the end of the suction pipe 24. Cover plates 32 and 34 or the like are provided to close the ends of the pipes 28 and 30, so that air can be drawn into the suction pipe 18 only through the small perforations 26 in the pipes 28. The perforations 36 are of a size to prevent the passage of grain while permitting the passage of air, dust and other fine material.

The suction pipe 24 extends to a powerful suction blower 38 capable of withdrawing air at a rapid rate from the grain in the bin 10. The illustrated suction blower 38 is of a commercially available type which is often employed as a pneumatic conveyor for withdrawing grain from one point and conveying it in a stream of air to another point. However, in this case, grain is excluded by the screen 26 from the suction pipe 24, so that the suction blower 38 handles only air, dust and other fine material.

In order that the suction blower 38 may develop a substantial vacuum in the grain, the top of the mass of grain in the bin 10 is covered with a flexible sheet or blanket 40 which excludes outside air from the top of the grain. The sheet 40 merely rests on the top of the grain and is of a sufficient size to cover the entire exposed top portion of the grain, and to lap over to some extent against the side wall 12 of the bin. The vacuum developed by the blower 38 seals the sheet 40 against the sides of the bin. The sheet 40 may be made of plastic film, sheet rubber, or some other flexible sheet material which is substantially impervious to air.

In this case, the suction pipe 24 enters the mass of grain through an opening 42 in the cover sheet 40. To prevent leakage of air into the grain throught he opening 42, the cover sheet 40 is in sealing engagement with the pipe 24. Thus, in the illustrated construction, the sheet 40 is supported adjacent the opening 42 by annular flange 44 mounted on the pipe 30 which is connected to the end of the suction pipe 24. The collar 46 presses the sheet 40 downwardly against the flange 44 around the opening 42. It should be noted, however, that the flange 44 and the collar 46 are not actually necessary, and may be dispensed with, because the vacuum developed below the sheet 40 will cause the sheet to be pressed against the pipe 24, in sealing engagement therewith.

If the closure 22 for the lower opening 20 is closed, the suction blower 38 will develop a substantial partial vacuum in the mass of grain contained in the bin 10. The vacuum accordingly promotes the evaporation of moisture contained in the grain. The water vapor in the grain is then withdrawn by the suction blower 38. Thus, the moisture content of the grain is greatly reduced. The evaporation of moisture from the grain has a pronounced cooling effect, with the result that the temperature of the grain is accordingly reduced. The suction blower 38 withdraws any foul odors or vapors from the grain, with the result that the grain is accordingly freshened. In addition, the suction blower cleans the grain by withdrawing quantities of dust and other fine material. It has been found that mold spores and other microorganisms are largely removed from the grain, and that deterioration is thereby prevented or arrested.

In one actual experiment, the invention was applied to 3250 bushels of grain stored in a bin with an initial moisture content of 14%. After the grain had been stored for a few weeks, the moisture content had risen to 20% and the temperature of the grain had risen to about 120 degrees. In this test, the suction blower was operated for about four hours, with the result that the moisture content of the grain was reduced to 13% and the temperature of the grain was reduced to about 94 degrees. Calculations based on these figures show that moisture vapor equivalent to 1100 gallons of water was removed from the grain during the four hour period.

In some cases, it is desired to ventilate the grain by introducing fresh air into the grain while the suction blower 38 is withdrawing stale, moisture laden air. For this purpose, an intake pipe 50 may be inserted into the grain through the bottom opening 20. The illustrated intake pipe 50 is fitted with a helical auger flight 52 so that the pipe 50 may be screwed into the mass of grain. The inner end of the pipe 50 is closed by a perforated section 54 acting as a screen to exlude grain from the pipe 50.

It is an easy matter to insert the pipe 50 into the grain. When the suction blower 38 is in operation, the door or closure 22 may be opened without losing any grain, inasmuch as the inrushing air retains the grain in the bin. As the pipe 50 is screwed into the grain, air flows into the outer end of the pipe and out of the perforated section 54, into the grain. This flow of air pushes the grain away from the perforated section 54 and makes it easy for the perforated section to penetrate the grain.

The closure 22 may be closed with the intake pipe in place, so that the grain may be subjected to alternate periods of vacuum and ventilation.

When the closure 22 is closed, a substantial vacuum is developed in the grain by the suction blower 38, as already indicated. Thus, atmospheric pressure exerts a very substantial force on the flexible cover sheet 40. However, this compressive force is readily taken up by the grain so that the cover sheet is not damaged. Thus, no great strength is required in the cover sheet 40.

Of course, atmospheric pressure also exerts a compressive force on the cylindrical side wall 12 of the bin 10. However, this compressive force is largely neutralized by the compressive force exerted on the top of the grain by the cover sheet 40. Moreover, the mass of grain backs up the side wall 12 and prevents the development of any dangerous stresses in the bin. Accordingly, there is no danger that the bin will collapse due to atmospheric pressure.

Figure 3:
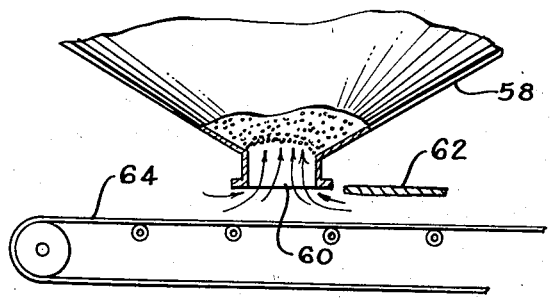
Fig. 3 is a diagrammatic elevational sectional view showing the application of the invention to a hopper bottom bin.

Fig. 3 shows the manner in which the invention may be applied to a bin having a hopper bottom 58 adapted to discharge grain downwardly through an axial bottom opening 60. In the usual arrangement, the opening 60 may be opened and closed by means of a door or gate 62. When the door 62 is open, the grain normally discharges on to a conveyor 64 or the like.

The invention may be applied to a hopper bottom bin in virtually the same manner as illustrated in Fig. 1. When it is desired to develop a vacuum in the bin, the door 62 is closed. When the grain is to be ventilated, the door 62 is opened so as to admit fresh air to the grain. Inrushing air supports the grain and prevents it from discharging through the opening 60, as illustrated in Fig. 3.

It will be recognized that the illustrated grain conditioning apparatus is highly portable and may readily be moved about to dry, cool and otherwise condition grain in existing storage bins. No modification of the existing storage facilities is required in the use of the conditioning apparatus. The grain is conditioned while it remains in the ordnary storage bin. Thus, there is no need to run or otherwise handle the grain. Thus, the present method of conditioning the grain is highly economical. At the same time, it is effective and easily carried out.

Various other modifications, alternative constructions and equivalents may be employed without departing from the true spirit and scope of the invention, as exemplified in the foregoing description and defined in the following claims.

I claim:

1. Apparatus for drying and cooling grain, said apparatus comprising a bin for holding the grain, said bin having an upper opening adjacent the top thereof and a lower opening adjacent the bottom thereof, a suction blower, a suction pipe extending from said blower through said upper opening and into said bin for immersion in the grain contained therein, a screen covering the end of said suction pipe in said bin to exclude grain from said pipe while admitting air thereto, a cover sheet for covering the top of the mass of grain in said bin to exclude air from the top of the grain, said suction pipe extending through an opening in said sheet and being in sealing engagement therewith to prevent leakage of air between said pipe and said sheet, closure means for opening and closing said lower opening in said bin, said suction blower being effective to develop a partial vacuum in the mass of grain in said bin with said closure means closed, and an air intake pipe extending from said lower opening into said bin for conveying fresh air into the central portion of the mass of grain in said bin, said intake pipe having a screen over the inner end thereof for excluding grain therefrom, said suction blower being effective to ventilate the grain with fresh air taken in through said intake pipe with said closure means open.

2. Apparatus for drying and cooling grain contained in a bin having upper and lower openings adjacent the top and bottom thereof, said apparatus comprising a suction blower, a suction pipe leading from said blower through the upper opening in said bin and into the upper portion of the mass of grain therein, a screen immersed in said grain and covering the end of said suction pipe for admitting air thereto while excluding grain, a cover sheet covering the top of the mass of grain in said bin for excluding air from the top of the grain, said cover sheet being made of flexible sheet material substantially impervious to air, said suction pipe extending through an opening in said sheet and being in sealing engagement therewith to prevent leakage of air around said pipe, said suction blower being effective to develop a partial vacuum in the mass of grain with the lower opening in said bin closed, and an intake pipe extending from said lower opening into the lower portion of the mass of grain in the bin for admitting fresh air to the grain with said lower opening open.

3. Apparatus for drying and cooling grain, said apparatus comprising a bin for holding the grain, said bin having an upper opening adjacent the top thereof and a lower opening adjacent the bottom thereof, a suction blower, a suction pipe extending from said blower through said upper opening and into said bin for immersion in the grain contained therein, a screen covering the end of said suction pipe in said bin to exclude grain from said pipe while admitting air thereto, a flexible cover sheet for covering the top of the mass of grain in said bin to exclude air from the top of the grain, said sheet being made of plastic film impervious to air, said suction pipe extending through an opening in said sheet and being in sealing engagement therewith to prevent leakage of air between said pipe and said sheet, closure means for opening and closing said lower opening in said bin, said suction blower being effective to develop a partial vacuum in the mass of grain in said bin with said closure means closed, and an air intake pipe extending into said bin from said lower opening therein for conveying fresh air into the central portion of the mass of grain in said bin, said intake pipe having a screen over the inner end thereof for excluding grain therefrom, said suction blower being effective to ventilate the grain with fresh air taken in through said intake pipe with said closure means open.

4. Apparatus for drying and cooling grain, said apparatus comprising a bin for holding the grain, said bin having an upper opening adjacent the top thereof and a lower opening adjacent the bottom thereof, a suction pipe extending through said upper opening and into said bin for immersion in the grain contained therein, a screen covering the end of said suction pipe in said bin to exclude grain from said pipe while admitting air thereto, a flexible cover sheet for covering the top of the mass of grain in said bin to exclude air from the top of the grain, said sheet being made of thin flexible material substantially impervious to air, said suction pipe extending through an opening in said sheet and being in sealing engagement therewith to prevent leakage of air between said pipe and said sheet, closure means for opening and closing said lower opening in said bin, and an intake pipe extending from said lower opening into the lower portion of the mass of grain in the bin for admitting fresh air to the grain when said lower opening is opened.

References Cited in the file of this patent

UNITED STATES PATENTS

| 1,703,782 | Schmidt | Feb. 26, 1929 |
| 2,063,430 | Graser | Dec. 8, 1936 |
| 2,547,383 | Huzenlaub | Apr. 3, 1951 |
| 2,578,090 | Plummer | Dec. 11, 1951 |

FOREIGN PATENTS

| 49,095 | Norway | Mar. 16, 1931 |